United States Patent Office 2,738,281
Patented Mar. 13, 1956

2,738,281

STABILIZATION OF EDIBLE FATS AND OILS

Joseph A. Chenicek, Bensenville, and Robert H. Rosenwald, Western Springs, Ill., assignors to Universal Oil Products Company, Chicago, Ill., a corporation of Delaware No Drawing. Application June 6, 1951,
Serial No. 230,262

20 Claims. (Cl. 99—163)

This application is a continuation-in-part of our copending application Serial No. 680,066, filed June 28, 1946, now abandoned, and relates to the stabilization of edible fats and oils and more particularly to a method of stabilizing edible fats and oils by incorporating therein a particular type of oxidation inhibitor and a novel synergist.

It recently has been discovered that the addition of certain compounds to oxidation inhibitors, when used to stabilize edible fats and oils, prevents or retards rancidity development for a period of time far in excess of that obtainable when utilizing the oxidation inhibitor alone. This phenomenon has been termed "synergism" and compounds which function in this manner are called "synergists."

The oxidation inhibitor to be utilized for the stabilization of edible fats and oils must meet severe requirements. The inhibitor must function to prevent or retard the development of rancidity in edible fats and oils. The inhibitor must be non-toxic so that it may be used safely without fear of possible poisoning. The inhibitor must not impart bad odor, color or taste to the fats and oils. The inhibitor must be readily soluble in fats and oils and further should not be removed therefrom during cooking or in deep fat frying due to its volatility or heat unstability. Another important property desired in the inhibitor is that it carry over into the bakery products. Many bakery products, such as crackers, potato chips, popcorn, etc., are kept for considerable periods of time in factories, stores or in the homes before consumption. These bakery goods tend to become rancid during these long periods of storage.

A number of oxidation inhibitors meet the requirements hereinbefore set forth in varying degrees. A particularly preferred class of oxidation inhibitors comprises those having a phenolic configuration. It now has been found that these phenolic inhibitors may be considerably increased in effectiveness by utilizing a particular class of compounds in conjunction with the inhibitor. The particular class of compounds exert a synergistic effect in increasing the effectiveness of the phenolic oxidation inhibitor.

A particularly preferred phenolic oxidation inhibitor comprises a 2-alkyl-4-alkoxyphenol and still more particularly a 2-tertiary-alkyl-4-alkoxyphenol including compounds as 2-tertiary-butyl-4-methoxyphenol, 2-tertiary-butyl-4-ethoxyphenol, 2-tertiary-butyl - 4 - propoxyphenol and 2-tertiary-butyl-4-butoxyphenol. Another preferred phenolic inhibitor comprises a hydroxy coumaran and still more particularly a 5-hydroxy coumaran substituted in the 6-position by a hydrocarbon group of at least 3 carbon atoms including compounds as 6-tertiary-butyl-5-hydroxy coumaran, 2-methyl-6-tertiary-butyl-5-hydroxy coumaran, 2,2-dimethyl-6-isopropyl-5-hydroxy coumaran, 2,2-dimethyl-6-secondary-butyl-5-hydroxy coumaran, 2,2-dimethyl-6-tertiary-butyl-5-hydroxy coumaran, etc. Other preferred phenolic inhibitors include N. D. G. A. (nordihydroguaiaretic acid), tocopherols, trialkyl phenols and more particularly 2,4,6-trialkyl phenols including compounds as 2,6-ditertiary-butyl - 4 - methylphenol, 2,4-dimethyl-6-tertiary-butyl-phenol, etc., alkyl catechols, propyl gallate, etc. It is understood that the novel features of the present invention may be applicable to any phenolic oxidation inhibitor which is suitable for use in edible fats and oils and that two or more of the phenolic inhibitors may be employed.

The edible fats and oils to which the present invention may be applied include linseed oil, menhaden oil, cod-liver oil, castor oil, olive oil, rapeseed oil, coconut oil, palm oil, corn oil, sesame oil, peanut oil, babassu oil, butter, fat, lard, beef tallow, etc., as well as hydrogenated oils and fats such as are sold under various trade names including "Spry," "Crisco," "Snowdrift," etc. It is understood that other oils and fats may be treated within the scope of the present invention, including oils and fats which previously have been subjected to various treatments such as blowing with air, heat treatment, etc.

In one embodiment the present invention relates to the process for stabilizing edible fats and oils which comprises incorporating therein a phenolic oxidation inhibitor and a synergist comprising an alkylene polyamine.

In a specific embodiment the present invention relates to the process for stabilizing edible fats and oils against rancidity which comprises incorporating therein from about 0.0001% to about 1% by weight of 2-tertiary-butyl-4-methoxyphenol inhibitor and from about 0.0001% to about 0.5% by weight of diethylene triamine.

In another specific embodiment the present invention relates to the process for stabilizing edible fats and oils which comprises incorporating therein from about 0.0001% to about 1% by weight of a 6-tertiary-alkyl-5-hydroxy coumaran and from about 0.0001% to about 0.5% by weight of a synergist comprising triethylene tetramine.

In still another specific embodiment the present invention relates to edible fats and oils normally tending to become rancid containing a small but effective amount of a phenolic oxidation inhibitor and a small but effective amount of a synergist comprising an alkylene polyamine.

In still another specific embodiment the present invention relates to an antioxidant composition comprising a 2-alkyl-4-alkoxyphenol and an alkylene polyamine synergist.

Any suitable alkylene polyamine may be used in accordance with the present invention. In general it is preferred that the total number of hydrocarbon atoms in the alkylene polyamine should not be greater than about 25 and still more particularly not greater than about 20. Suitable alkylene polyamines include ethylene diamine, diethylene triamine, triethylene tetramine, tetraethylene pentamine, etc., 1,2-diamino-propane, 3,3'-iminobispropylamine, dipropylene triamine, 1,2-diamino-butane, 1,2-diamino-pentane, 1,3-diamino-butane, 1,3-diamino-pentane, 1,4-diamino-pentane, 1,4-diamino-hexane, 1,4-di-amino-heptane, 1,3,5-triamino-pentane, 1,3,6 - triamino-hexane, 1,4,7-triamino-heptane, etc., hexamethylene di-amine, hexamethylene tetramine, etc., 3-isopropylaminopropylamine, 1,2-di-(phenylamino)-ethane, 1,3-di-(phenylamino)-propane, 1,4-di-(phenylamino)-butane, etc. It is understood that two or more of the alkylene polyamine compounds may be employed when desired.

It is understood that the compounds specifically set forth herein are merely typical representatives of the class of compounds which may be used in accordance with the broad scope of the present invention and that the various compounds are not necessarily of equivalent synergistic potency in the various edible fats and oils and with the different phenolic oxidation inhibitors in which they may be used.

Many edible fats and oils, and particularly certain vegetable oils, contain phenolic compounds which have an oxidation inhibitor effect and these compounds are generally referred to as natural inhibitors, including tocopherols, etc. In some cases the addition of a synergist in the manner set forth herein will result in a product which is stabilized sufficiently for all practical purposes without the necessity of employing an added oxidation inhibitor. The use of a synergist in connection with these natural inhibitors is also comprised within the scope of the present invention.

While the present invention is directed specifically to edible fats and oils, there are a number of greases and lubricating oils utilized in machines for cutting, storing, pressing or other handling of foods. Where there is a possibility of the grease or oil coming into contact with the food or food product, it is desirable that the grease or lubricating oil be non-toxic, and also that any compounds added thereto likewise be non-toxic. The application of a phenolic oxidation inhibitor and the synergist as herein set forth to such greases and oils is comprised within the scope of the present invention.

The synergist and phenolic oxidation inhibitor may be added to edible fats and oils in any suitable manner, including forming a mixture of synergist and inhibitor and then adding the mixture to the fats and oils, or else adding the synergist and inhibitor separately to the fats and oils. If either the inhibitor or synergist is a solid at room temperature, it or they may be added as a powder and thoroughly mixed in the edible fats and oils, but preferably may be heated to a moderate temperature at which it or they become fluid and then added as a liquid to the fats and oils.

In general the amount of synergist employed will be less than the amount of phenolic oxidation inhibitor used. The amount of phenolic oxidation inhibitor usually will be less than 1% and more commonly within the range of from about 0.0001% to about 1% by weight of the fats and oils, and the synergist generally will be less than 0.5% by weight and more specifically within the range of from about 0.0001% to about 0.5% by weight of the fats and oils.

The following examples are introduced to illustrate further the novelty and utility of the present invention but not with the intention of unduly limiting the same.

EXAMPLE I

The lard utilized in these tests had a stability period of 6 hours as determined by the Swift test. This test is described in detail in the article by A. E. King, H. L. Roschen and W. H. Irwin, which appeared in Oil and Soap, volume X, No. 6, pages 105 to 109 (1933). In general this test comprises bubbling air through a sample of the lard until rancidity is determined organoleptically or by peroxide values.

The phenolic oxidation inhibitor utilized in these tests comprised 2-tertiary-butyl-4-methoxyphenol. The synergist comprised diethylene triamine. A mixture of three parts by weight of the inhibitor and one part by weight of the synergist was prepared and this mixture was added to different samples of the lard in amounts of 0.005% by weight and 0.01% by weight. The stability of the lard without any additive, with only the phenolic oxidation inhibitor and with the mixture of both the inhibitor and the synergist are shown below:

Table

| Composition: | Stability (hours) |
|---|---|
| Lard | 6 |
| Lard+0.005% inhibitor | 24 |
| Lard+0.005% of mixture (0.00375% inhibitor+0.00125% synergist) | 34 |
| Lard+0.01% inhibitor | 35 |
| Lard+0.01% of mixture (0.0075% inhibitor+0.0025% synergist) | 60 |

It will be noted that the addition of very small amounts of the synergist has increased the stability of the lard from 24 to 34 hours in one case and from 35 to 60 hours in the other case. This improvement permits storing of the lard for a considerably longer period of time without danger of the lard becoming rancid.

EXAMPLE II

The lard used in this example had a stability period of 8 hours. Upon the addition of 0.01% by weight of 2,2-dimethyl-6-tertiary-butyl-5-hydroxy coumaran, the stability of the lard was increased to 40 hours. However, upon the addition to another sample of the same lard of 0.01% by weight of 2,2-dimethyl-6-tertiary-butyl-5-hydroxy coumaran and 0.005% by weight of diethylene triamine, the stability period of the lard was increased to 86 hours. On the other hand, the use of 0.005% by weight of diethylene triamine alone has substantially no effect in increasing the stability period of the lard.

From the above data it is apparent that the use of the alkylene polyamine along with the hydroxy coumaran oxidation inhibitor served to increased the effectiveness for a considerably longer period of time than is obtained with the phenolic oxidation inhibitor alone.

EXAMPLE III

To corn oil containing about 0.1% by weight of tocopherol, there may be added 0.001% by weight of a synergist comprising ethylene diamine. This will serve to considerably extend the stability period of the corn oil.

EXAMPLE IV

Rancidity development in beef fat may be considerably retarded by the addition thereto of 0.02% by weight of N. D. G. A. (nordihydroguaiaretic acid) and 0.003% by weight of 3,3'-iminobispropylamine.

EXAMPLE V

The phenolic oxidation inhibitor for use in this example comprises 2,6-di-tertiary-butyl-4-methylphenol. It will be employed in a concentration of 0.02% by weight of the edible oil. The synergist comprises triethylene tetramine which will be employed in a concentration of 0.01% by weight. This antioxidant composition will serve to prolong the stability period of the edible oil for a time considerably in excess of that obtained solely through the use of the phenolic oxidation inhibitor.

We claim as our invention:

1. The process for stabilizing edible fats and oils which comprises incorporating therein a phenolic oxidation inhibitor and a synergist comprising an alkylene polyamine consisting of carbon, hydrogen and nitrogen.

2. The process for stabilizing edible fats and oils which comprises incorporating therein from about 0.0001% to about 1% by weight of a 2-alkyl-4-alkoxyphenol inhibitor and from about 0.0001% to about 0.5% by weight of a synergist comprising an alkylene polyamine consisting of carbon, hydrogen and nitrogen.

3. The process for stabilizing edible fats and oils which comprises incorporating therein from about 0.0001% to about 1% by weight of 2-tertiary-butyl-4-methoxyphenol inhibitor and from about 0.0001% to about 0.5% by weight of a synergist comprising an alkylene polyamine.

4. The process for stabilizing edible fats and oils which comprises incorporating therein from about 0.0001% to about 1% by weight of a hydroxy coumaran inhibitor and from about 0.0001% to about 0.5% by weight of a synergist comprising an alkylene polyamine consisting of carbon, hydrogen and nitrogen.

5. The process for stabilizing edible fats and oils which comprises incorporating therein from about 0.0001% to about 1% by weight of nordihydroguaiaretic acid inhibitor and from about 0.0001% to about 0.5% by weight of a synergist comprising an alkylene polyamine.

6. The process for stabilizing edible fats and oils containing from about 0.0001% to about 1% by weight of a tocopherol inhibitor which comprises incorporating therein from about 0.0001% to about 0.5% by weight of a synergist comprising an alkylene polyamine.

7. The process for stabilizing edible fats and oils which comprises incorporating therein from about 0.0001% to about 1% by weight of a polyalkyl phenol inhibitor and from about 0.0001% to about 0.5% by weight of a synergist comprising an alkylene polyamine.

8. Edible fats and oils normally tending to become rancid containing a phenolic oxidation inhibitor and a synergist comprising an alkylene polyamine consisting of carbon, hydrogen and nitrogen.

9. Edible fats and oils normally tending to become rancid containing from about 0.0001% to about 1% by weight of a 2-alkyl-4-alkoxyphenol inhibitor and from about 0.0001% to about 0.5% by weight of a synergist comprising an alkylene polyamine consisting of carbon, hydrogen and nitrogen.

10. Lard normally tending to become rancid containing from about 0.0001% to about 1% by weight of 2-tertiary-butyl-4-methoxyphenol inhibitor and from about 0.0001% to about 0.5% by weight of a synergist comprising an alkylene polyamine.

11. Lard normally tending to become rancid containing from about 0.0001% to about 1% by weight of 2-tertiary-butyl-4-methoxyphenol and from about 0.0001% to about 0.5% by weight of a synergist comprising diethylene triamine.

12. Lard normally tending to become rancid containing from about 0.0001% to about 1% by weight of 2-tertiary-butyl-4-methoxyphenol and from about 0.0001% to about 0.5% by weight of a synergist comprising triethylene tetramine.

13. Lard normally tending to become rancid containing from about 0.0001% to about 1% by weight of 2-tertiary-butyl-4-methoxyphenol and from about 0.0001% to about 0.5% by weight of a synergist comprising 1,3-diaminobutane.

14. Edible fats and oils normally tending to become rancid containing from about 0.0001% to about 1% by weight of 2-tertiary-butyl-4-methoxyphenol and from about 0.0001% to about 0.5% by weight of a synergist comprising an alkylene polyamine.

15. Edible fats and oils normally tending to become rancid containing from about 0.0001% to about 1% of a 6-tertiary-alkyl-5-alkoxy coumaran, and from about 0.0001% to about 0.5% by weight of a synergist comprising an alkylene polyamine.

16. Edible fasts and oils normally tending to become rancid containing from about 0.0001% to about 1% of 2-tertiary-butyl-4-methoxyphenol and from about 0.0001% to about 0.5% by weight of a synergist comprising diethylene triamine.

17. Edible fats and oils normally tending to become rancid containing from about 0.0001% to about 1% of nordihydroguaiaretic acid inhibitor and from about 0.0001% to about 0.5% by weight of a synergist comprising an alkylene polyamine.

18. Edible fats and oils normally tending to become rancid containing from about 0.0001% to about 1% of tocopherol inhibitor and from about 0.0001% to about 0.5% by weight of a synergist comprising an alkylene polyamine.

19. Edible fats and oils normally tending to become rancid containing from about 0.0001% to about 1% of a polyalkylphenol and from about 0.0001% to about 0.5% by weight of a synergist comprising an alkylene polyamine.

20. Edible fats and oils normally tending to become rancid containing from about 0.0001% to about 1% of 2,6-di-tertiary-butyl-4-methylphenol and from about 0.0001% to about 0.5% by weight of a synergist comprising an alkylene polyamine.

References Cited in the file of this patent

UNITED STATES PATENTS

| | | |
|---|---|---|
| 2,181,121 | Downing | Nov. 28, 1939 |
| 2,315,858 | Johnston et al. | Apr. 6, 1943 |
| 2,400,876 | Daskais et al. | Mar. 28, 1946 |